United States Patent [19]

Okamura et al.

[11] Patent Number: 4,842,299
[45] Date of Patent: Jun. 27, 1989

[54] AIR BAG DOOR FASTENING STRUCTURE

[75] Inventors: Shotaro Okamura, Toyota; Satoshi Shimomura, Okazaki, both of Japan

[73] Assignee: Toyota Jidosha Kabushiki Kaisha, Toyota, Japan

[21] Appl. No.: 143,382

[22] Filed: Jan. 13, 1988

[30] Foreign Application Priority Data

Jan. 13, 1987 [JP] Japan ............................... 62-3150[U]

[51] Int. Cl.$^4$ ............................................. B60R 21/10
[52] U.S. Cl. .................................... 280/732; 280/743
[58] Field of Search ............... 280/728, 730, 731, 732, 280/743

[56] References Cited

U.S. PATENT DOCUMENTS

| | | | |
|---|---|---|---|
| 3,622,176 | 11/1971 | Byer | 280/732 |
| 3,632,132 | 1/1972 | Richardson | 280/732 |
| 4,334,699 | 6/1982 | Patzelt et al. | 280/731 |

FOREIGN PATENT DOCUMENTS

| | | |
|---|---|---|
| 990748 | 6/1976 | Canada . |
| 990749 | 6/1976 | Canada . |
| 2324571 | 11/1973 | Fed. Rep. of Germany . |
| 2425659 | 12/1975 | Fed. Rep. of Germany ...... 280/732 |
| 51-1932 | 1/1976 | Japan . |

Primary Examiner—Charles A. Marmor
Assistant Examiner—Ross Weaver
Attorney, Agent, or Firm—Cushman, Darby & Cushman

[57] ABSTRACT

An air bag door fastening structure having an air bag door including a base layer of synthetic resin, coupled at one side end thereof through hinges with an instrument panel and at the other side end thereof through breakaway members with the instrument panel characterized in that each breakaway member comprises two fastening portions integrally coupled through a thin integral hinge with each other as a coupler in such a manner that one fastening portion is coupled fixedly with the base layer or integrated with the base layer and the other fastening portion is coupled fixedly with the instrument panel.

6 Claims, 3 Drawing Sheets

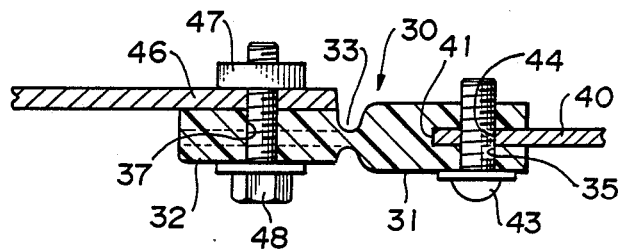
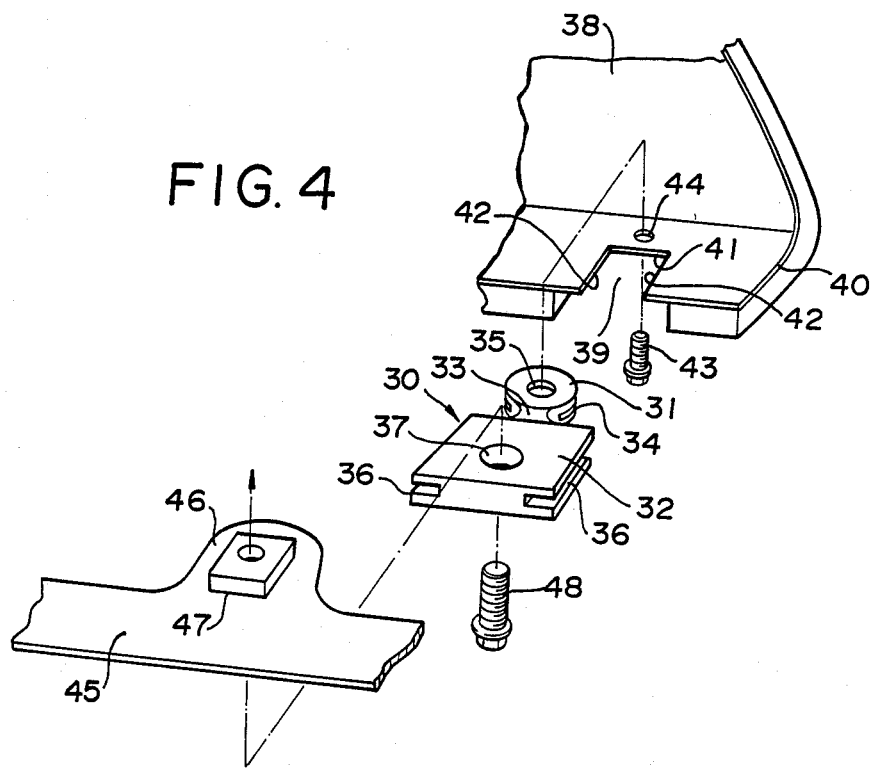

4,842,299

AIR BAG DOOR FASTENING STRUCTURE

BACKGROUND OF THE INVENTION

The present invention relates to improvements in an air bag door fastening structure for a vehicle.

An air bag apparatus is sometimes provided, for a driver's seat or passenger's seat.

Japanese Utility Model Laid-open No. 1932/1976 discloses a structure for providing an air bag apparatus inside an instrument panel in a passenger compartment.

In this system, a bag developing gas generator is covered with an air bag cover, and the air bag cover is clamped by screws at an instrument panel. The air bag cover is formed with a row of holes so that the air bag cover is readily collapsible when the bag is developed.

Thus, a row of holes of the air bag is visible in the visual field of the passenger to provide wrong external appearance.

FIG. 5 shows an air bag fastening structure which does not have such a drawback. In FIG. 5, reference numeral 1 designates an air bag door, which is coupled at its upper end through hinges (FIG. 2) with an instrument panel 2 and at its lower end through breakaway members 3 with the instrument panel 2. In the instrument panel portion, nuts 5 are welded to a frame 4 at the positions corresponding to recesses formed on the lower end of the air bag door 1. Threaded holes 6 are respectively formed in the recesses of the air bag door 1.

Each breakaway member 3 made of synthetic resin is formed with a contracted portion 11 at the center thereof and with openings 7 and 8 at both sides thereof, and clamped by screws 9 and 10 at the threaded holes 6 and nuts 5.

Thus, an air bag apparatus body is ordinarily concealed by the air bag door 1. The breakaway member 3 is collapsed at its contracted portion 11 by means of the developing force of the air bag when it operates, and the air bag door 1 is thus opened so that the air bag is developed between the passenger and wind shield.

In this system, reference numeral 12 designates a door for a globe box.

This conventional breakaway member 3 is, however, not bent in a direction that the air bag door 1 is opened.

Thus, the clamping works of the air bag door 1 to the instrument panel are complicated. Further, a bent portion 13 must be formed at an acute angle at the air bag door 1.

In this system, it is necessary to increase the contracted portion 11 of the breakaway member 3 to be readily collapsed at an emergency time of the vehicle, but if the contracted portion 11 of the breakaway member 3 is increased, there is a possibility that the breakaway member 3 might be collapsed by a vibration at ordinary time.

SUMMARY OF THE INVENTION

Accordingly, an object of the present invention is to provide an air bag door fastening structure in which the contracted portion of a breakaway member is not collapsed by an ordinary vibration even if the contracted portion is increased and an air bag can be readily mounted by a configuration that the contracted portion of the breakaway is bendable.

In order to achieve the above and other objects, there is provided according to the present invention an air bag door fastening structure having an air bag door including a base layer of synthetic resin, coupled at one side end thereof through hinges with an instrument panel and at the other side end thereof through breakaway members with the instrument panel characterized in that each breakaway member comprises two fastening portions integrally coupled through a thin integral hinge with each other as a coupler in such a manner that one fastening portion is coupled fixedly with the base layer or integrated with the base layer and the other fastening portion is coupled fixedly with the instrument panel.

As described above, since the breakaway member is formed by coupling two fastening portions through the integral hinge, even if the end of the air bag door is slightly displaced from that of the instrument panel when mounting the air bag door, the two fastening portions are bent at the integral hinge, thus readily clamping the air bag door.

The thin integral hinge of the breakaway member is collapsed at emergency time of the vehicle so that the air bag door is opened.

BRIEF DESCRIPTION OF THE DRAWINGS

The above and other related objects and features of the invention will be apparent from a reading of the following description of the disclosure found in the accompanying drawings and novelty thereof pointed out in the appended claims.

FIG. 3 is a longitudinal sectional view of a coupling portion of the lower end of an air bag door with the frame of an instrument panel in another embodiment of an air bag door fastening structure according to the present invention;

FIG. 4 is an exploded perspective view of another embodiment; and

DESCRIPTION OF THE PREFERRED EMBODIMENTS

This invention will now be described in detail with reference to FIGS. 1 to 4, which show an embodiment of an air bag door fastening structure according to this invention.

Figure 1:
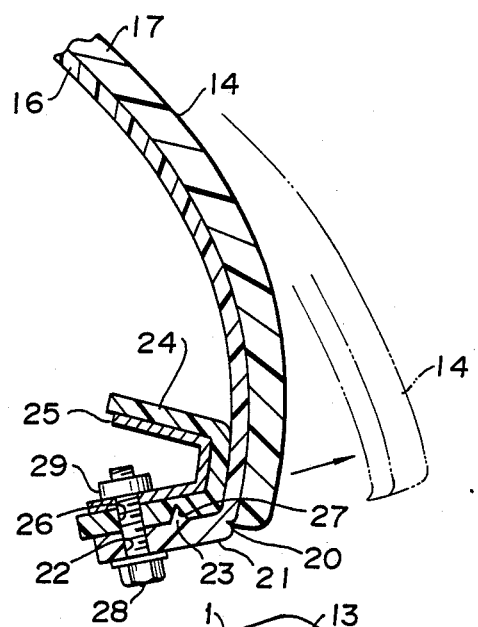
FIG. 1 is a longitudinal sectional view of a coupling portion of the lower end of an air bag door with the frame of an instrument panel in an embodiment of an air bag door fastening structure according to the present invention.
Figure 5:
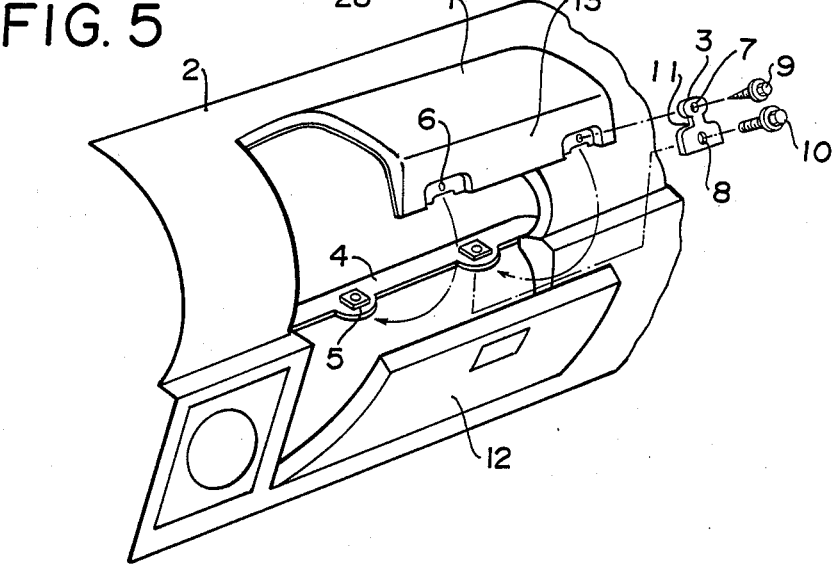
FIG. 5 is an exploded perspective view of a conventional example.
Figure 2:
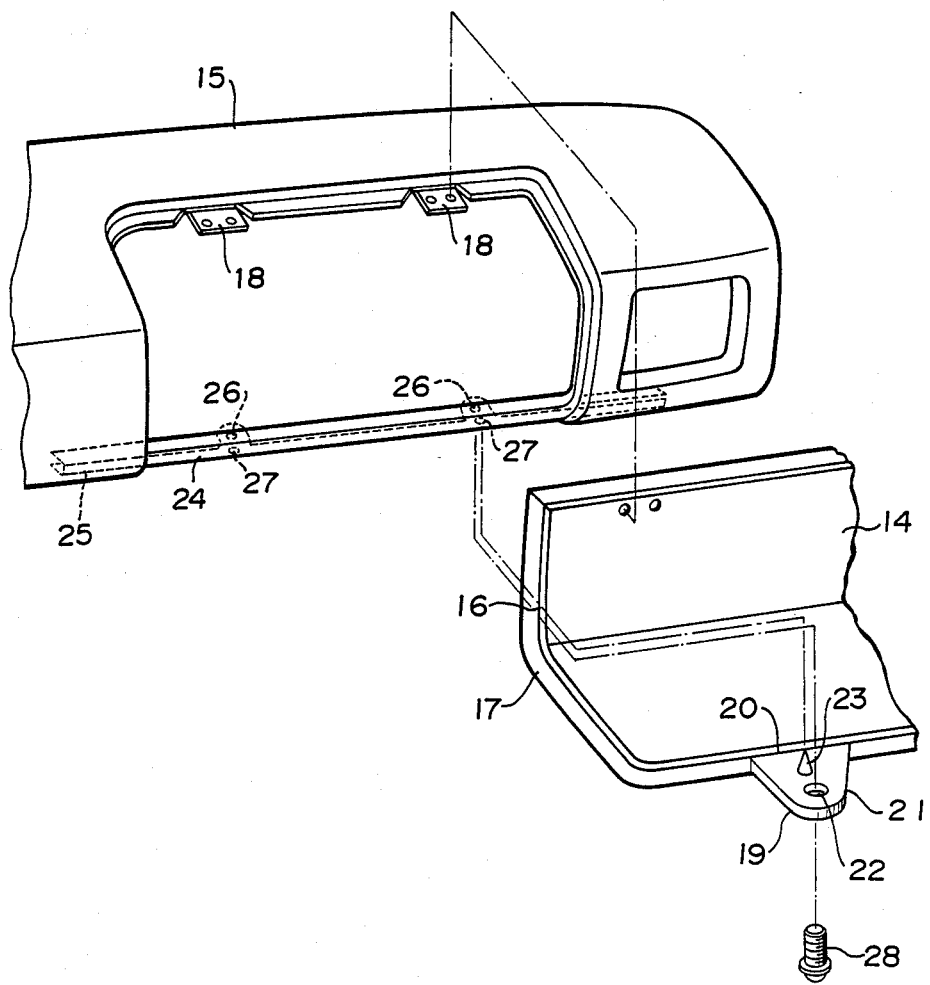
FIG. 2 is an exploded perspective view of the air bag door and the instrument panel of the embodiment.

In FIGS. 1 and 2, reference numeral 14 designates an air bag door, and numeral 15 designates an instrument panel opposed to a passenger seat.

The air bag door 14 has a base layer 16 made of synthetic resin as an inner door, and a foamed urethane resin layer 17 with a skin (not drawn) sequentially laminated on the base layer 16.

The air bag door 14 is formed, as seen from its front, substantially in a rectangular shape, and coupled at its upper end with the instrument panel 15 through a hinge 18 made of ordinary metal.

The air bag door 14 is formed at its lower end with breakaway members 19 integrated with the base layer 16.

Each breakaway member 19 is formed as a coupler of two fastening portions coupled through a thin integral hinge 20. One fastening portion of the breakaway member 19 is integrated initially with the base layer 16, and only the other fastening portion 21 is projected out of the base layer 16.

The other fastening portion 21 of the breakaway member 19 is formed in a tongue shape with an opening 22 and a projection 23.

An inverted U-shaped cross-sectional frame 24 is formed at the instrument panel 15 opposed to the lower end of the air bag door 14, and reinforced by a reinforcing member 25 formed by bending an iron plate.

The frame 24 is formed at its lower porton with an opening 26 communicating with the opening of the fastening portion 21 of the breakaway member 19 and a positioning opening 27 to be engaged with the projection 23 of the breakaway member 19.

Fastening portion 21 of the breakaway member 19 is, as shown in FIG. 2, disposed at the lower portion of the frame 24 and fastened to the frame 24 by engaging the projection 23 with the positioning opening 27 and inserting bolts 28 into two openings 22 and 26 communicating with each other by the engagement of the projection 23 with the positioning opening 27.

A nut 29 to be engaged with the bolt 28 is welded to the reinforcing member 25 made of an iron plate.

The air bag door 14 mounted on the instrument panel 15 is disposed in the same plane as the instrument panel 15 to prepare a good external appearance and to conceal and protect an air bag apparatus body.

An inflater operates at an emergency of a vehicle to inflate the air bag. Thus, the integral hinge 20 of the breakaway member 19 is collapsed as shown by a dotted chain line in FIG. 1 by the pressure of the air bag to open the air bag door 14. Then, the air bag door 14 is pivotally turned upward at the upper hinges 18 so that the air bag is developed and expanded between a passenger and wind shield.

FIGS. 3 and 4 show another embodiment of an air bag door fastening structure according to the present invention.

In FIGS. 3 and 4, reference numeral 30 designates a breakaway member.

The breakaway member 30 is so formed that two fastening portions 31 and 32 are coupled through a thin integral hinge 33, one fastening portion 31 is formed substantially in a circular shape and the other fastening portion 32 is formed substantially in a square shape.

The one fastening portion 31 of the breakaway member 30 is formed with a peripheral cutout 34 in the intermediate on the peripheral side thereof and with an opening 35 perpendicularly at the center of the circular shape. The other fastening portion 32 of the breakaway member 30 is formed with lateral grooves 36 recessed in the lateral intermediate at opposite peripheral sides and with an opening 37 perpendicularly at the center of the square shape.

The air bag door 38 to be coupled with one fastening portion 31 of the breakaway member 30 is formed at its lower end with substantially U-shaped cross-sectional cutouts 39. The base layer 40 is formed with edges 41 at the portions thereof corresponding to the cutouts 39, which edges 41 are respectively inserted into the cutouts 34 of the one fastening portions 31 of the breakaway members 30, and also formed with edges 42 at the portions thereof corresponding to the cutouts 39, which edges 42 are respectively inserted into the grooves 36 of the other fastening portions 32 of the breakaway members 30.

Each breakaway member 30 is inserted to be contained entirely within the U-shaped cutout 39 of the base layer 40, a bolt 43 is inserted into the openings 35 and 44, which opening 44 is perforated at the position thereof in alignment with the opening 35 of the one fastening portion 31 of the breakaway member 30 so that the breakaway member 30 is fastened to the base layer 40.

Thus, each breakaway member 30 is tightly fastened to the air bag door 38. Thus, even if a vibration is applied, the integral hinge 33 of the breakaway member 30 is hardly fatigued.

A projection 46 to be superposed with the other fastening portion 32 of the breakaway member 30 is formed on the reinforcing member 45 of the frame of the instrument panel, and a nut 47 is welded to the projection 46. The projection 46 and the fastening portion 32 of the breakaway member 30 are clamped integrally by the bolt 48 inserted into the opening 37 as shown in FIG. 3.

In operation of the other embodiment of the air bag door fastening structure, the integral hinge 33 of the breakaway member 30 is collapsed at an emergency time of the vehicle, and the air bag door 38 is thus opened. Then, the air bag door 38 is pivotally turned upward at the hinges 18 (in FIG. 2) as fulcra in the same manner as the first embodiment.

Since the air bag door fastening structure of the invention is thus constructed, even if the air bag door is slightly erroneously displaced at the portions to be coupled with the instrument panel, the breakaway members are bent at the integral hinges thereof to be suitably fastened fixedly. Further, when fastening the air bag door, the clamping works of the air bag door at the instrument panel can be simply and rapidly performed.

Further, the bending angle of the bent portion of the air bag door can be alleviated.

In addition, since the breakaway member of the air bag door fastening structure has the thin integral hinge, the breakaway member can be rapidly collapsed to be accelerated at an emergency time of the vehicle.

What is claimed is:

1. An air bag door fastening structure having an air bag door including a base layer of synthetic resin, coupled at one side end thereof through hinges with an instrument panel and at another side end thereof through breakaway members with said instrument panel, said breakaway member comprising two fastening portions integrally coupled through a thin integral hinge with each other as a coupler in such a manner that one fastening portion is coupled fixedly with said base layer and the other fastening portion is coupled fixed with said instrument panel, said other fastening portion comprising a projection formed thereon; and said instrument panel comprises an opening to be positioned with said projection of said breakaway member.

2. An air bag door fastening structure having an air bag door including a base layer of synthetic resin, coupled at one side end thereof through hinges with an instrument panel and at another side end thereof through breakaway members with said instrument panel, said breakaway member comprising two fastening portions integrally coupled through a thin integral hinge with each other as a coupler in such a manner that one fastening portion is coupled fixedly with said base layer and another fastening portion is coupled fixed with said instrument panel, said one fastening portion of said breakaway member comprises a peripheral cutout formed in opposing peripheral sides thereof, said air bag door comprising an lower end, said lower end comprising cutouts, said cutouts engaged with said breakaway member; and said air bag door further comprising edges, said edges inserted into said peripheral cutout of said breakaway member.

3. The air bag door fastening structure according to claim 1 or 2, wherein said each breakaway member is disposed at the lower end of said air bag door and hinges are provided at the upper end of said air bag door.

4. The air bag door fastening structure according to claim 1 or 2, wherein said breakaway member is clamped by bolts and nuts with the instrument panel.

5. The air bag door fastening structure according to claim 1 or 2, wherein said air bag door comprises a synthetic resin base layer and a formed urethane resin layer and a skin sequentially laminated on the base layer.

6. The air bag door fastening structure according to claim 1 or 2, wherein the instrument panel portion to be coupled with said each breakaway member is formed as a substantially U-shaped cross-sectional frame and said breakaway member is fastened with the lower portion of the instrument panel portion.

* * * * *